(12) United States Patent
Butler

(10) Patent No.: US 6,776,013 B2
(45) Date of Patent: Aug. 17, 2004

(54) AERODYNAMIC MINERAL WOOL FORMING BUCKET

(75) Inventor: Robert C. Butler, Warrington, PA (US)

(73) Assignee: Certainteed Corporation, Valley Forge, PA (US)

( * ) Notice: Subject to any disclaimer, the term of this patent is extended or adjusted under 35 U.S.C. 154(b) by 10 days.

(21) Appl. No.: 10/283,453

(22) Filed: Oct. 30, 2002

(65) Prior Publication Data

US 2004/0083764 A1 May 6, 2004

(51) Int. Cl.[7] .............................................. C03B 37/04
(52) U.S. Cl. .............................. 65/454; 65/458; 65/526
(58) Field of Search ........................... 65/454, 458, 526

(56) References Cited

U.S. PATENT DOCUMENTS

| | | | |
|---|---|---|---|
| 3,787,194 A | * | 1/1974 | Rayle et al. .................... 65/522 |
| 3,881,903 A | * | 5/1975 | Stalego .......................... 65/526 |
| 4,090,241 A | | 5/1978 | Houston |
| 4,359,444 A | * | 11/1982 | Shah et al. .................. 264/518 |
| 4,371,312 A | | 2/1983 | Tank |
| 4,478,624 A | * | 10/1984 | Battigelli et al. .............. 65/458 |
| 4,592,769 A | * | 6/1986 | Lemaignen .................... 65/377 |
| 4,889,546 A | * | 12/1989 | Denniston ..................... 65/464 |
| 4,927,004 A | | 5/1990 | Leaton |
| 4,958,571 A | | 9/1990 | Puckett |
| 5,314,521 A | | 5/1994 | Lewis et al. |
| 5,364,431 A | | 11/1994 | Lewis et al. |
| 5,493,796 A | | 2/1996 | Ballew et al. |
| 5,553,404 A | | 9/1996 | Bergeron |
| 6,237,260 B1 | | 5/2001 | Gooch |

OTHER PUBLICATIONS

Merriam Webster's Collegiate Dictionary, 10th ed, 1997 p. 136.*

"Glass Fiber Manufacturing," (9/85) pp. 11.13–1 through 11.13–16.

* cited by examiner

Primary Examiner—John Hoffmann
(74) Attorney, Agent, or Firm—Duane Morris LLP

(57) ABSTRACT

A forming bucket for use in the preparation of gas attenuated fiber insulation products includes a tubular member having a fiber inlet and a fiber outlet. The tubular member has a conical portion disposed between the fiber inlet and the fiber outlet. The conical portion has a smooth curvilinear surface for minimizing turbulence in a fiber stream flowing through the forming bucket during the gas attenuation process.

23 Claims, 10 Drawing Sheets

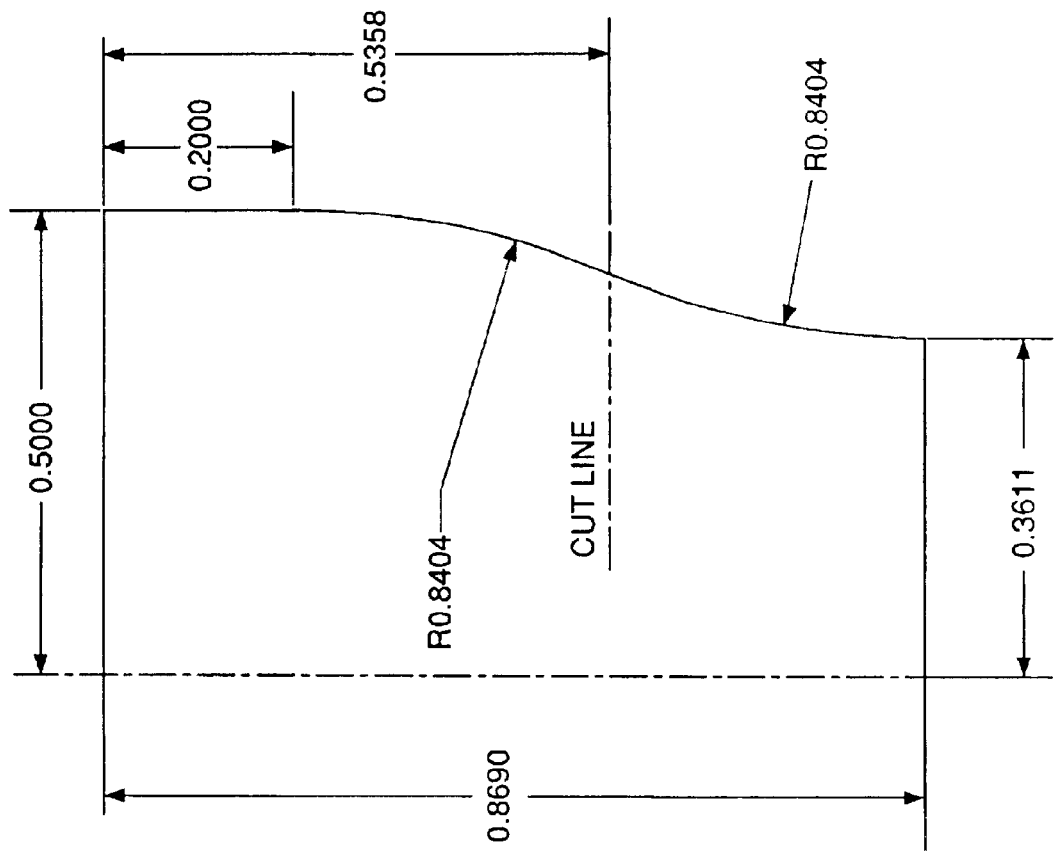

AERODYNAMIC MINERAL WOOL FORMING BUCKET

FIELD OF THE INVENTION

The present invention relates to methods and systems for manufacturing fiber insulation, and more particularly to methods and systems for manufacturing wool fiber insulation via a gas attenuation process.

BACKGROUND OF THE INVENTION

One prior art system for manufacturing glass wool insulation is described in U.S. Pat. No. 4,090,241 to Houston, entitled "Method for Estimating and Controlling the Mass Flow Rate of a Free Falling Fluid Stream," issued May 16, 1978, the entirety of which is hereby incorporated by reference herein. In the system described in Houston, raw material or batch is conveyed from storage bins to a melting furnace to form molten glass. The molten glass free falls through several spaced bushings, each of which is positioned above a respective fiberizing apparatus. The fiberizing apparatus includes a centrifuge device that projects radial streams of molten glass into a transverse gaseous blast directed downward toward a horizontally moving collecting belt or forming chain. The gaseous blasts form the molten streams of glass emanating from the centrifuge into hollow cylindrical fiber veils that are deposited upon the forming chain. Before reaching the forming chain, it is common to treat the flowing fibers with a binding material. An uncured glass wool pack is thereby built upon the forming chain including glass fibers, coated with binding material. The wool pack then passes through a thermal oven wherein the binder cures. The final wool pack is then typically chopped into bans of a desired length and packaged. These systems are often referred to as gas attenuated fiber insulation manufacturing systems. The products formed thereby are referred to as gas attenuated fiber insulation products.

In some commercial embodiments of a manufacturing system described above, a forming bucket is positioned between each centrifuge and the collecting belt or forming chain. The hollow cylindrical glass fiber veils, which include millions of glass fibers, are projected downward towards the chain or belt through the forming buckets. The veils are then treated with binder and collected on the forming chain or collecting belt. Each forming bucket oscillates or swings perpendicularly to the length and direction of the forming chain or collecting belt. The plurality of forming buckets thereby cooperate to direct the fiber veils to deposit the fibers evenly across the forming chain.

A portion of this system is illustrated in FIG. 1. A bucket 10, which is shown in cross section, swings perpendicularly to the length and direction of the forming chain or collecting belt 12, which moves in the direction indicated by the arrows. The bucket 10 is made to swing by partially rotating arms 16 back and forth to direct the glass fibers 14 (moving in the direction indicated by the double arrows) through bucket 10 and evenly across the width of the belt 12 as it moves.

FIGS. 2A and 2B illustrate forming buckets currently in use in a manufacturing system described above. FIG. 2B is a side elevational view of a bucket 40 used with an 800 mm diameter fiberizer. Buckets used in connection with an 800 mm diameter fiberizer are sometimes referred to herein as "800 mm buckets". The bucket 40 has a top or input diameter $D_I$ of approximately 3'-6¹³⁄₁₆" and an output diameter $D^O$ of 2'-6¼". The bucket 40 has a height $H_1$ of 7⅞" and a height $H_2$ of 2'-9½". FIG. 2A is a side elevational view of a bucket 50 used in connection with a 600 mm diameter fiberizer. Buckets of this type are sometimes referred to herein as "600 mm buckets". The bucket 50 has a top or input diameter $D_I$ of approximately 2'-7½" and an output diameter $D_O$ of 1'-10¹¹⁄₁₆". The bucket 40 has a height $H_1$ of 1'-1⁹⁄₁₆' and a height $H_2$ of 2'-7⅝".

As can be seen in FIGS. 2A–2B, both prior art buckets 50, 40 consist of a hollow, linear conical portion that terminates at a circular sleeve portion having a consistent diameter. These buckets are typically welded at their inlets to a mounting collar, not shown, that includes the arms 16 that are rotated to swing the buckets, as described above with respect to FIG. 1, across the forming chain or collecting belt.

As buckets 40, 50 swing during the gas attenuation process, some of the fibers that flow through the buckets contact the inner walls of the buckets, primarily due to turbulence in the fiber stream within the forming buckets. The fibers that collide with the inner surface of a bucket tend to entangle and form what are referred to in the industry as "ropes." The binder that is sprayed into the fiber stream as it exits the forming buckets cannot fully penetrate these ropes, leading to poor binder distribution and poor mass density of the resultant wool fiber insulation mats and affecting both the physical and mechanical properties of the insulation mats.

Therefore, there is a need to reduce or eliminate the formation of fiber ropes in a gas attenuated fiber insulation manufacturing process. To that end, there is a need for a new forming bucket that reduces or prevents the formation of fiber ropes in insulation mats, particularly in gas attenuated fiberglass insulation mats.

SUMMARY OF THE INVENTION

A forming bucket for use in the preparation of gas attenuated fiber insulation products is provided. The forming bucket includes a tubular member having a fiber inlet and a fiber outlet. The tubular member has a conical portion disposed between the fiber inlet and the fiber outlet. The conical portion has a smooth curvilinear surface for minimizing turbulence in a fiber stream flowing through the forming bucket during the gas attenuation process.

The forming bucket so provided is more aerodynamic than prior art buckets and reduces collisions between the fibers of the fiber stream and the interior surface of the forming bucket. This, in turn, reduces the formation of fiber ropes that are difficult to impregnate with binder. Binder distribution thereby improves along with the mass density of the fiber mat, resulting in improved physical and mechanical properties of the fabricated insulation products.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which:

FIGS. 6A–6B are partial views of a 600 mm bucket and an 800 mm bucket illustrating exemplary dimensional ratios.

DETAILED DESCRIPTION

Figure 1:
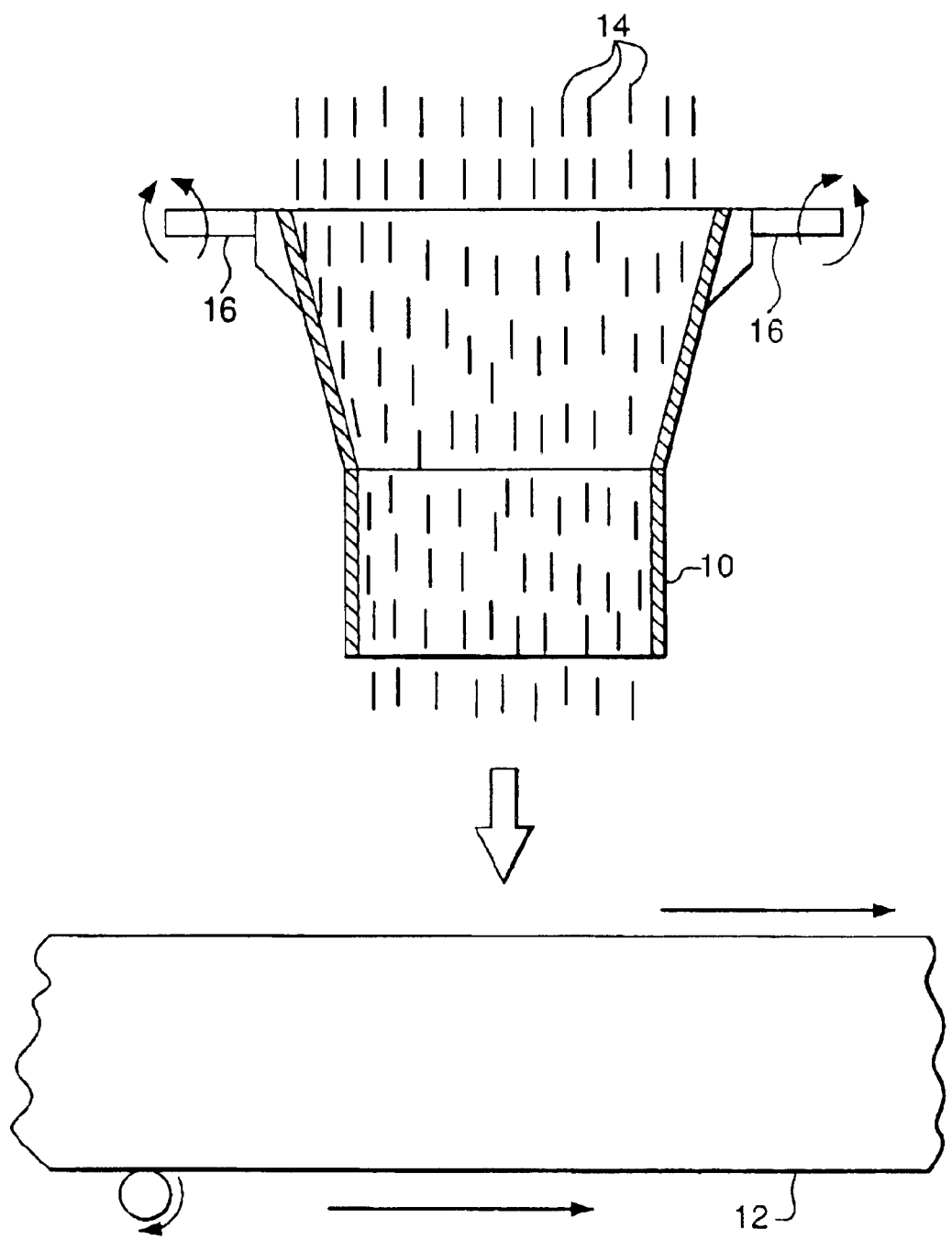
FIG. 1 is an illustration of a portion of a gas attenuated fiber insulation fabrication system.
Figure 2B:
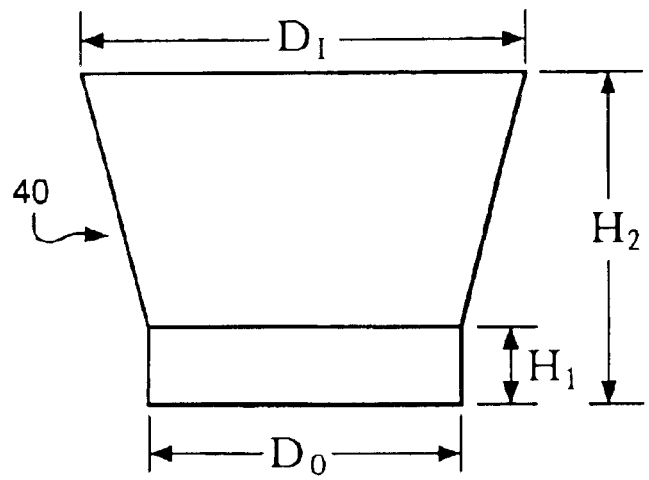
FIGS. 2A–2B are side elevational views of two prior art forming buckets.
Figure 2A:
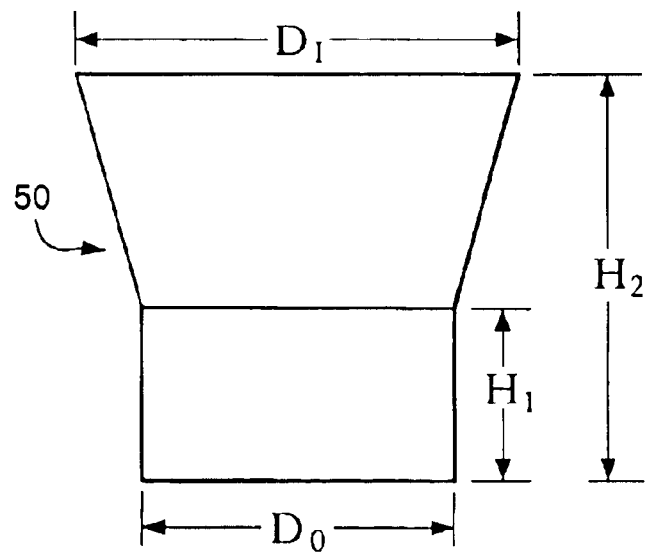

As described above, the system of FIG. 1, which utilizes the 600 or 800 mm buckets described in connection with FIGS. 2A and 2B, produces fiber ropes described above that are difficult to impregnate with binder. One solution to this problem is to identify a better method of providing binder to the fiber ropes. An alternative solution is to substantially reduce or prevent the formation of the fiber ropes. The manufacturing system and method described hereafter are directed to the latter solution in that it addresses the formation of the fiber ropes.

Fiber streams flowing through the prior art forming buckets were originally observed using high-speed cameras and strobe lights in an attempt to identify the cause of the fiber rope formation. This technique only provided a picture of the fiber stream behavior at the inlets and outlets of the monitored forming buckets. In order to better understand the behavior of the fiber stream within the forming buckets, the 600 mm bucket of FIG. 2A described above in the Background of the Invention section was computer simulated using Computational Fluid Dynamics (CFD) models.

Figure 5A:
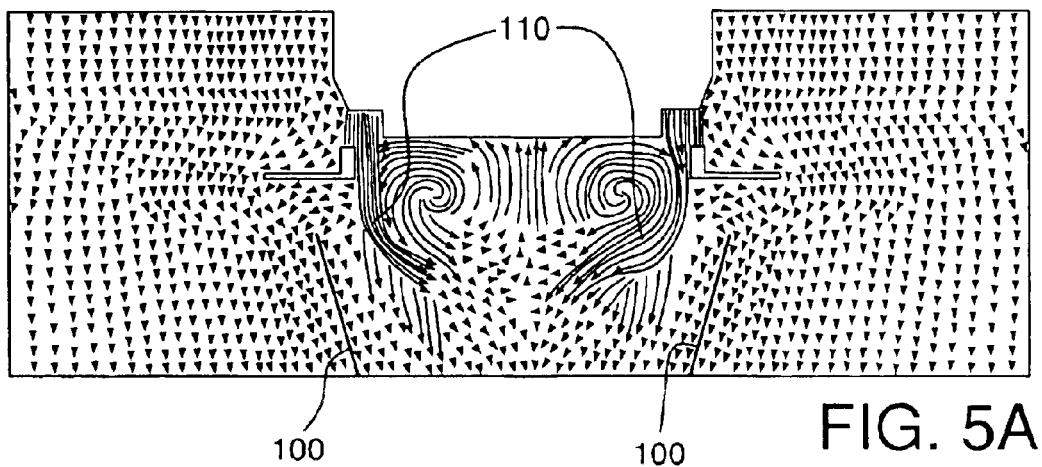
FIGS. 5A–5C are CFD velocity contour and vector curves for a prior art forming bucket shown at various swing angles.
Figure 5B:
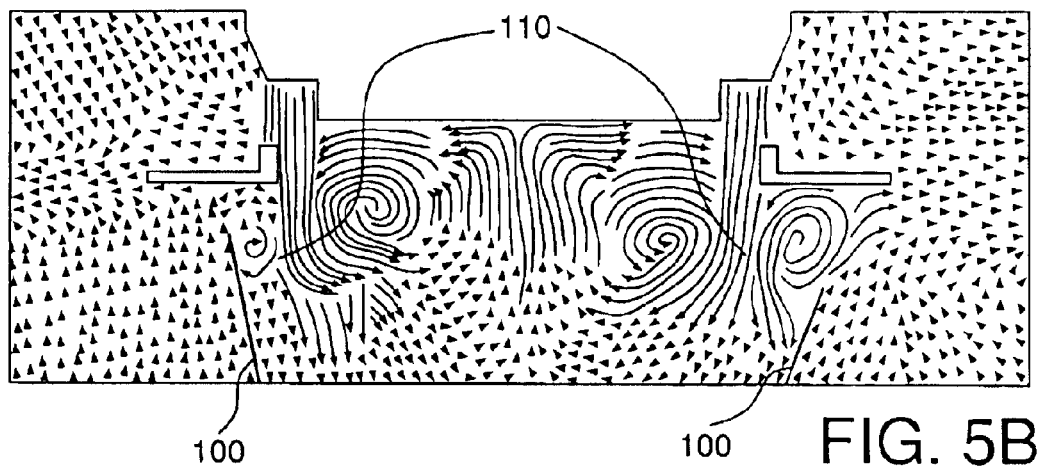
Figure 5C:
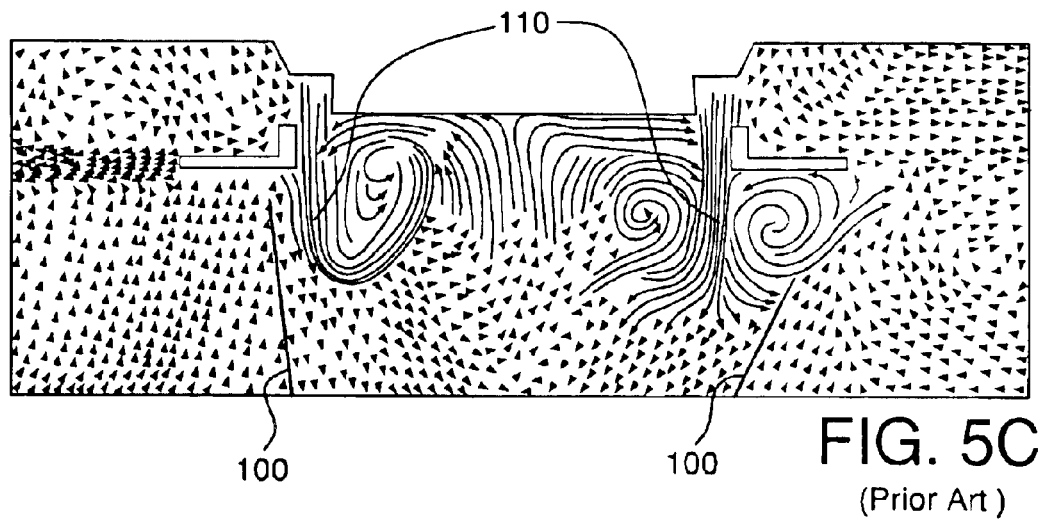

As described above with respect to the system of FIG. 1, the forming buckets swing across the width of the collecting belt or forming chain. Each bucket typically swings across the belt at an angle of ±8–12° from center at a frequency of 60 Hz. FIGS. 5A, 5B and 5C show the velocity contours and vectors for the fiber stream flowing through this prior art forming bucket at 0°, 5° and 10° swing angles, respectively. The relative velocity of the strean at various locations cannot be discerned from the contour curves of FIGS. 5A–5C because the figures are not provided in color, but FIGS. 5A–C do clearly reveal areas of significant turbulence (identified generally by references 110) proximate to the inlet of the modeled forming bucket. A portion of the modeled bucket proximate to the inlet is shown by wall 100. It is believed that this turbulence in the gas stream that carries the fibers causes the fibers in the fiber stream to contact the walls 100 of the forming bucket, particularly near the inlet of the forming bucket. It is also believed that this contact causes the fibers to entangle, forming the aforementioned fiber ropes.

Figure 3A:
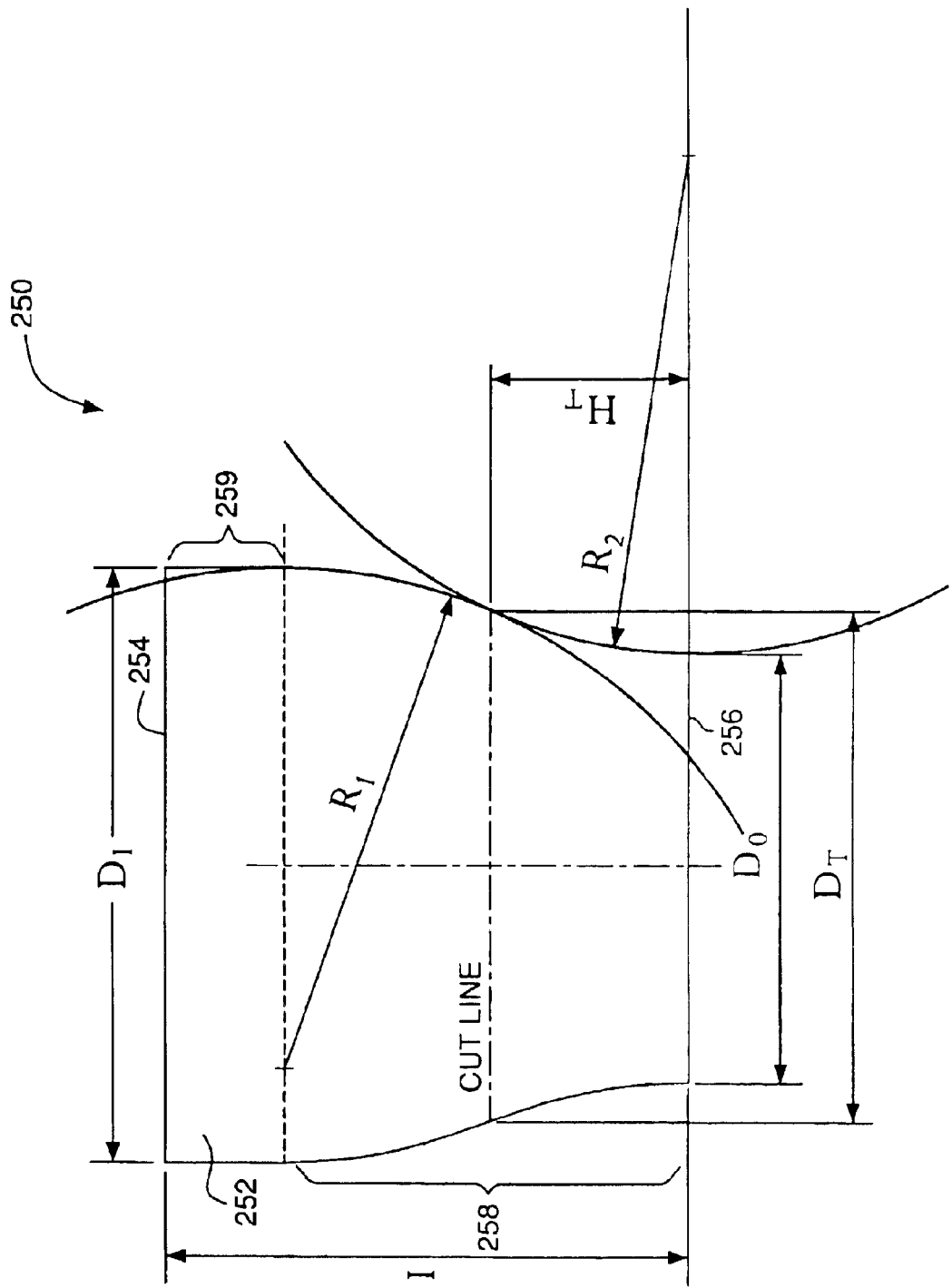
FIGS. 3A–3B are side elevational views of two exemplary embodiments of aerodynamic forming buckets.

A series of modifications to the existing 600 mm forming bucket design were explored to reduce turbulence in the fiber stream within the forming bucket. It was believed that a more aerodynamic forming bucket would improve the performance of the forming bucket by minimizing turbulence, thereby reducing or eliminating contact between the fiber stream and the walls of the forming bucket. One explored design was to remove the sharp angles found in the prior art forming bucket by providing the forming bucket with a smooth curvilinear portion between the inlet and outlet. FIG. 3A is a side elevational view of an exemplary 600 mm forming bucket that is generally bell-shaped. The forming bucket 250 includes a tubular member 252 having an inlet 254 and an outlet 256. The tubular member 252 has a conical portion disposed between the inlet 254 and outlet 256. The conical portion has a smooth curvilinear surface, indicated generally at region 258, for minimizing turbulence in the fiber stream flowing through the forming bucket 250 during the gas attenuation process. The conical portion may be disposed after a first section indicated by reference 259 where the tubular member 252 has a uniform diameter for a set length. It was found, as discussed below in connection with FIGS. 4A–4C, that this generally bell-shaped forming bucket provides excellent results when modeled and when tested.

After extensive modeling of possible designs for 600 mm forming buckets using CFD, it was found that a design that substantially conforms to the dimensional ratios indicated in FIG. 6A (which shows a partial view of a forming bucket) should be effective in reducing turbulence in the fiber stream within a 600 mm forming bucket. Important dimensions as shown in FIG. 6A include the inlet and outlet diameters of the interior surface of the tubular member, height, cut line location, radii of curvature of the curvilinear surface of the conical portion, and the length of the first section proximate to the inlet of the tubular member having a uniform diameter. An exemplary bucket 250 (FIG. 3A), designed in accordance with the rules of FIG. 6A, has an inlet diameter ($D_I$) at the interior surface of the tubular member 252 of 2'-7½", an outlet diameter ($D_O$) of 1'-10¾" and a height (H) of 2'-3⅜". The curvilinear surface 258 has an outwardly bowed portion proximate to section 259 having first radius of curvature $R_1$ of 2' 2½" and an inwardly bowed portion proximate to outlet 256 having second radius of curvature $R_2$ of 2' 2½". The inwardly bowed and outwardly bowed portions meet at a transition height $H_T$ of 10½". The transition diameter $D_T$ at the interior surface of the forming bucket at the transition height $H_T$ is 2' 3¹⁄₁₆". Section 259 proximate the inlet 254 has a set length of 6⁵⁄₁₆".

Figure 4A:
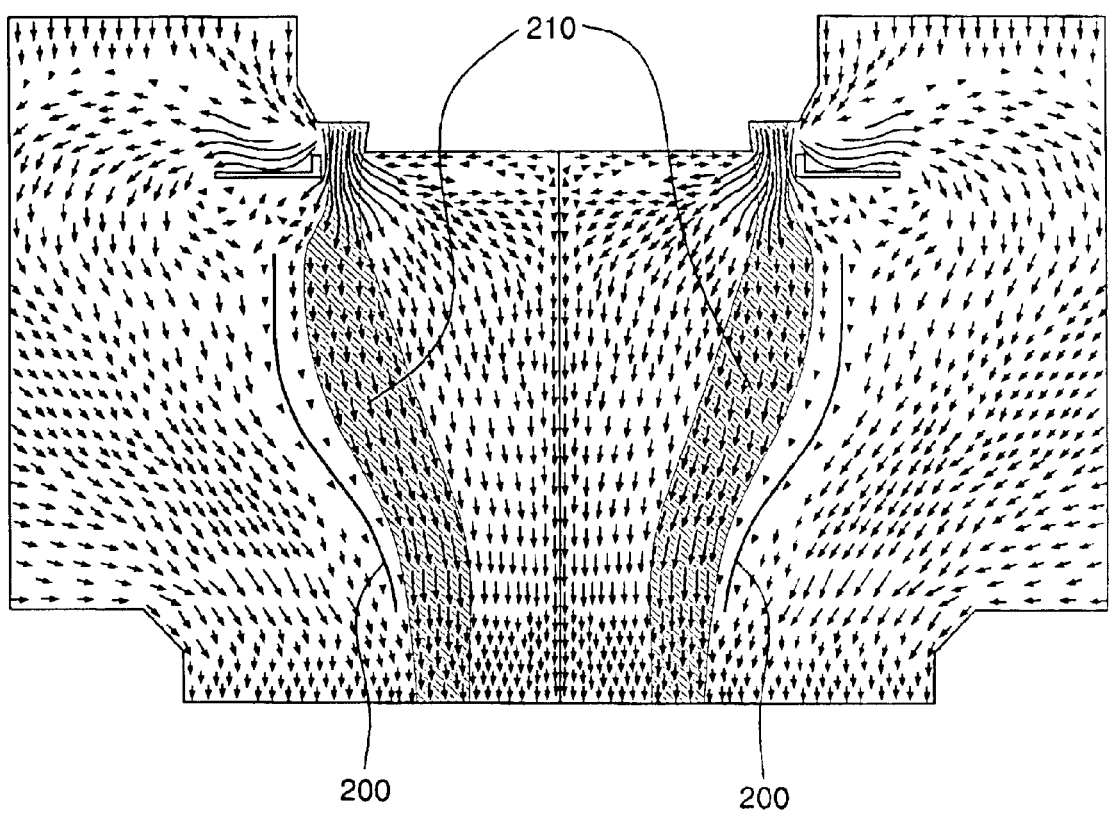
FIGS. 4A–4C are CFD velocity contour and vector curves for an exemplary aerodynamic forming bucket shown at various swing angles.
Figure 4B:
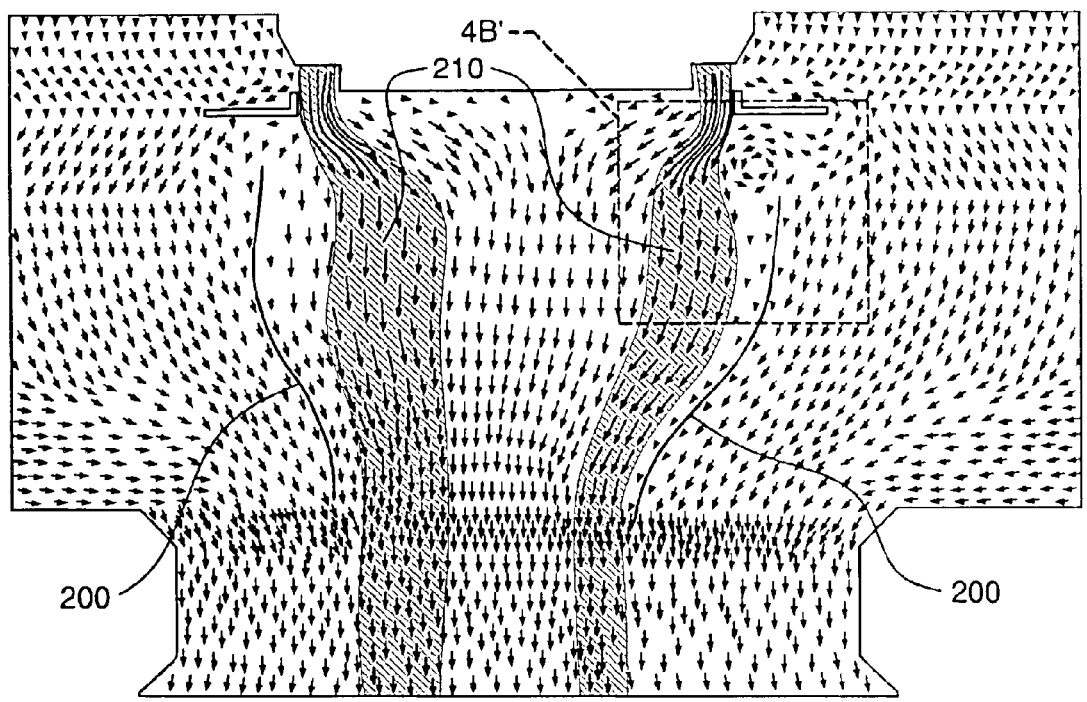
Figure 4B:
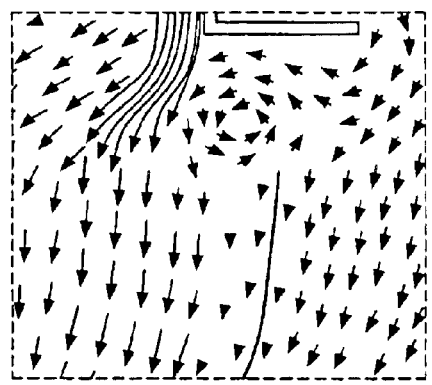
Figure 4C:
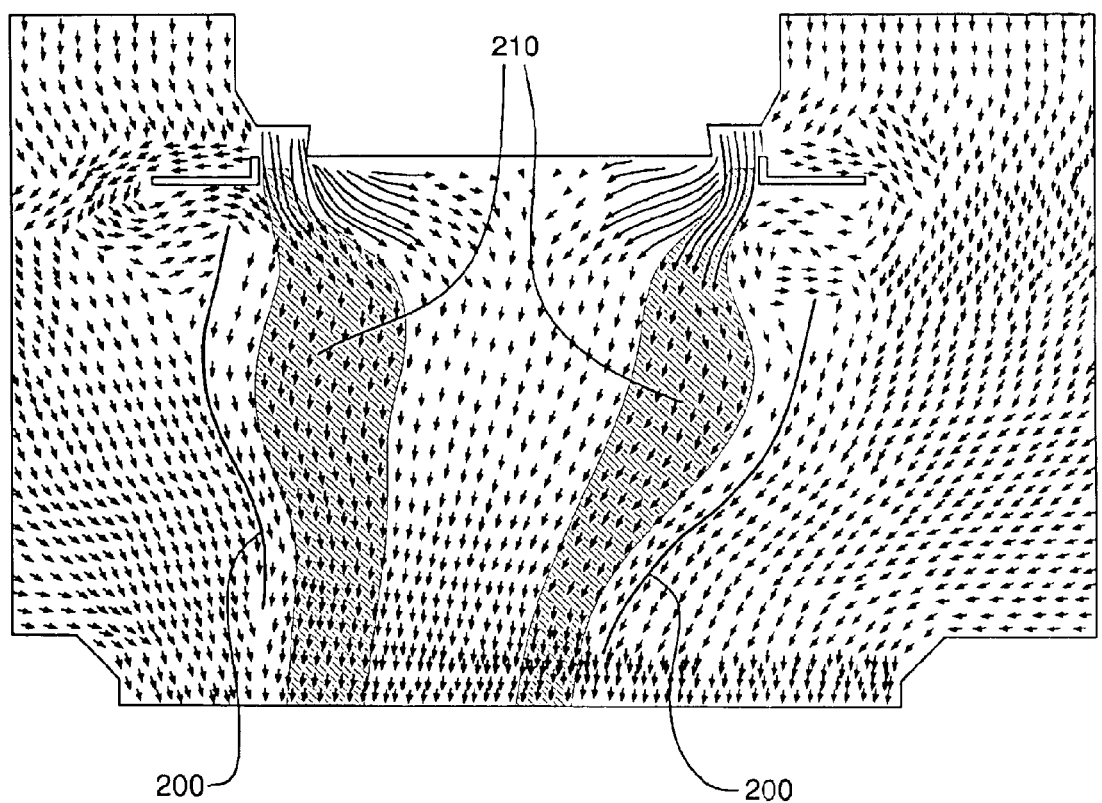

FIGS. 4A–4C show the CFD velocity contours and vectors for the fiber stream at 0°, 5° and 10° for the bucket 250 shown in FIGS. 3A and 6A. The relative velocity of the stream at various locations cannot be clearly seen from the contour curves because the figures are not provided in color, but FIGS. 4A–4C clearly show that the selected design minimizes impact of the fibers of the fiber stream with the interior surface of the wall of the forming bucket (shown by reference 200), particularly at maximum swing angles. Darker areas 210 in FIGS. 4A–4C represent areas of the highest velocity of the fiber stream. These areas are spaced from the walls 200 of the modeled forming bucket and would serve to keep fibers from contacting the walls of the bucket in an actual gas attenuation process because the fibers would follow the high velocity, non-turbulent gas flow. It is clear from FIGS. 4A–4C that there are no significant regions of turbulence in the fluid stream between the wall 200 and within the modeled forming bucket. This is best seen in the enlarged, partial view of the inlet of the bucket shown in FIG. 4B'. FIG. 4B' shows that little if any turbulence can be found within the bucket itself, i.e., within the tubular member shown by wall 200, in other words the bucket is at least about 90% turbulent free.

Figure 3B:
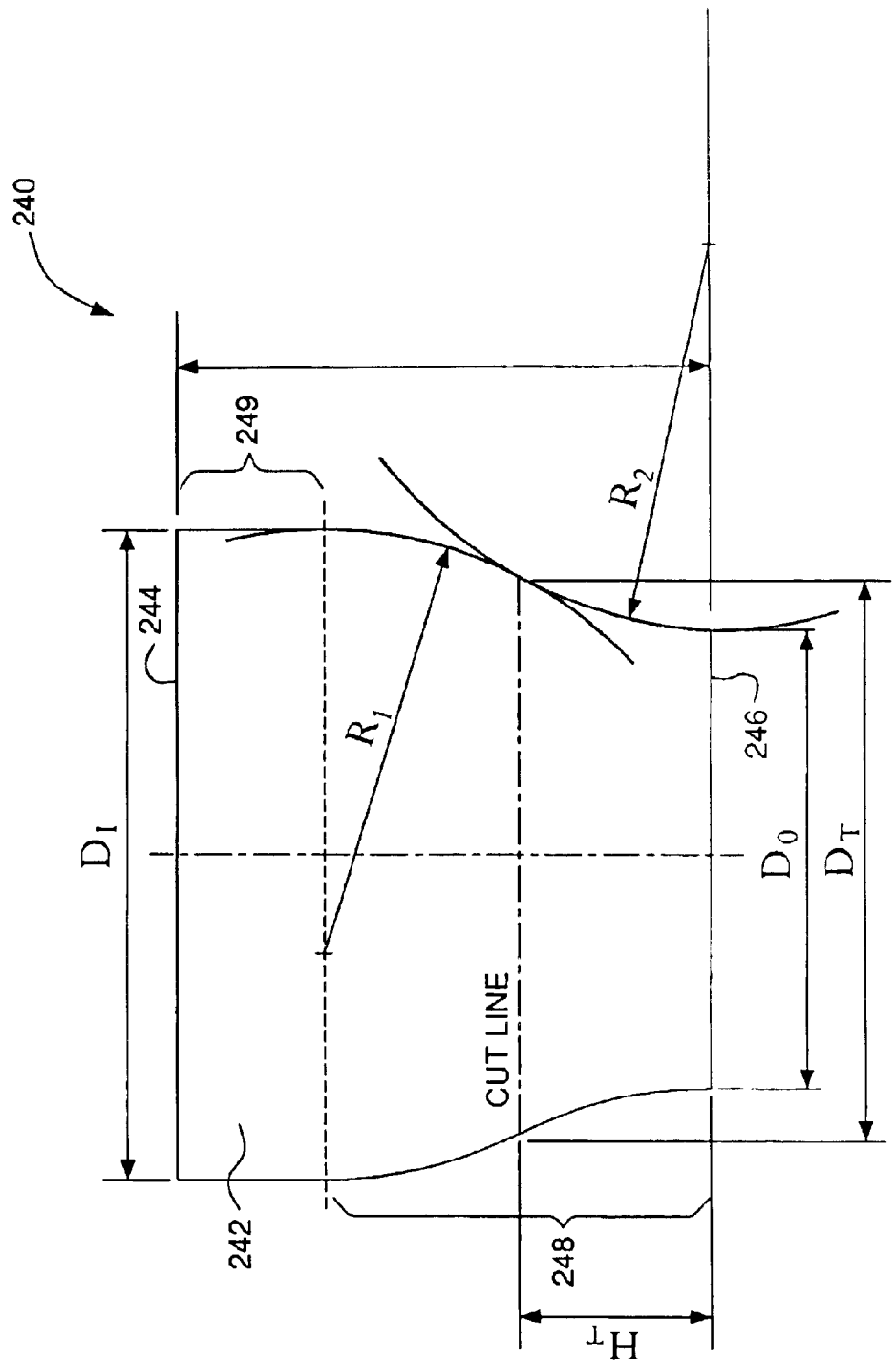

After the design of the 600 mm bucket was confirmed using the above-described CFD modeling techniques, a new forming bucket was fabricated to test on an existing gas attenuated fiberglass insulation production line that utilizes 800 mm buckets. It should be understood that the forming bucket described herein may also be used in the manufacture of non-glass insulation products, such as wool insulation products including mineral fibers, such as stone wool. The 800 mm design was initially scaled linearly from the 600 mm design of FIG. 6A, and molded from hot roll steel. The bucket was used in a gas attenuated fiber insulation fabrication system. When tested, significant blowback of fibers was observed, and the bucket was immediately removed from the system. It was then discovered via further CFD analysis that the relationship between the exemplary 600 mm and 800 mm buckets is not linear. An optimal 800 mm design was then developed in the same manner described above using CFD modeling. The design for this bucket 240 is shown in FIG. 3B.

Like the 600 mm forming bucket 250 of FIG. 3A, the forming bucket 240 includes a tublar member 242 having an inlet 244 and an outlet 246. The tubular member 242 has a conical portion disposed between the inlet 244 and outlet 246. The conical portion has a smooth curvilinear surface, indicated generally at region 248, for minimizing turbulence in the fiber stream flowing through the forming bucket 240 during the gas attenuation process. The conical portion is shown disposed after an area indicated by reference 249 where the tubular member has a uniform diameter for a set length. In one embodiment, the tubular member is formed from spun steel.

Figure 6B:
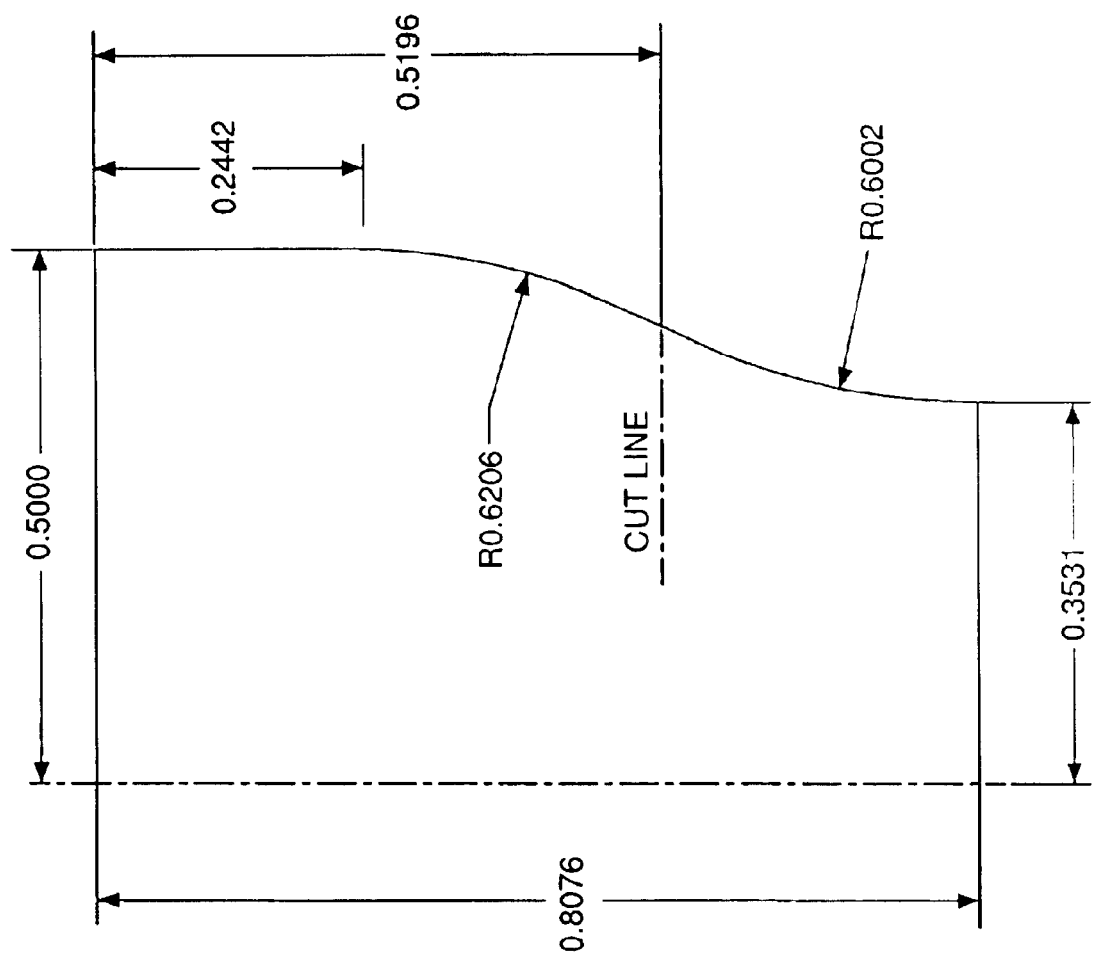

After extensive modeling of possible designs for 800 mm forming buckets using CFD, it was found that a design that substantially conforms to the dimensional ratios indicated in FIG. 6B (which shows a partial view of a forming bucket) should be effective in reducing turbulence in the fiber stream within a 800 mm forming bucket. Again, important dimensions as shown in FIG. 6B include the inlet and outlet diameters of the interior surface of the tubular member, height, cut line location, radii of curvature of the curvilinear surface of the conical portion, and the length of the section proximate to the inlet having a uniform diameter. An exemplary bucket 240 (FIG. 3B) designed substantially in accordance with the design rules of FIG. 6B has an inlet diameter ($D_I$) of the interior surface of the forming bucket of 3'-6 13/16" and an outlet diameter ($D_O$) of 2'-6 1/4". The forming bucket 240 has a height (H) of 2'-10 9/16". The curvilinear surface 248 has an outwardly bowed portion having first radius of curvature $R_1$ of 240 -2 9/16" and an inwardly bowed portion having second radius of curvature $R_2$ of 2'-1 11/16. The inwardly bowed and outwardly bowed portions meet at a transition height $H_T$ of 1'-0 5/16". The transition diameter $D_T$ at the interior surface of the forming bucket at the transition height $H_T$ is 3'-0 15/16". The section 249 proximate the inlet 244 has a length of 9 5/8".

The previously manufactured test bucket described above was modified to conform to these dimensions and, consequently, to the rules of FIG. 6B, and it was tested in an 800 mm gas attenuated fiber insulation manufacturing process. The process was monitored, and a noticeable difference in the fiber appearance exiting the outlet 246 of the forming bucket was observed. The exit angle of the fiber stream from the outlet increased to more than 60° from 45° observed with the prior art bucket. This indicated that the fiber stream was not being redirected from collisions with the walls of the new bucket. The fibers disposed in the final insulation product were more evenly distributed and fewer fiber ropes were observed.

The forming bucket described herein can be formed from various materials and by various methods, as long as the method and selected materials can achieve relatively highly precise dimensions. In one exemplary embodiment, the forming bucket is formed from steel. The forming bucket, however, may be also be cast, or molded and may be formed from other metals or even ceramics.

As described, the new forming bucket provided herein can be utilized in a gas attenuated fiber insulation manufacturing system and method, such as the system and method described in connection with FIG. 1 of the Background of the Invention section. Molten glass or other material is provided to fiberizers spaced above a collecting belt or forming chain. A forming bucket is provided between each fiberizer and the belt or chain. As described above, in one embodiment of a manufacturing system and method, the forming buckets swing perpendicular to the length of the belt or chain, typically at an angle of ±8–12° from center at a frequency of 60 Hz. A binder source, such as a plurality of spray sources, is disposed between the forming buckets and the belt or chain. A fiber stream from each fiberizer flows through a respective forming bucket toward the belt or chain. The fibers are treated with binder after they exit the outlet of the forming bucket and before collecting on the belt or chain. The collected and treated fibers are then processed into a gas attenuated insulation product, i.e., the wool pack passes through a thermal oven where the binder cures and the resultant mat is typically chopped into batts of a desired length and packaged.

Two exemplary design examples of forming buckets are provided above. It should be understood, however, that the invention described herein is by no means limited to these particular examples. It is understood that the particular design may vary dependent at least upon the size of the fiberizer (e.g., 600 mm, 800 mm or another size) and process conditions, such as the flow rate of the fiber stream and size of the fiber veil. It is believed, however, that any design for a forming bucket for reducing turbulence in a fiber stream therein should include a tubular member having a conical portion disposed between a fiber inlet and outlet and including a smooth curvilinear surface for minimizing turbulence in the fiber stream flowing through the forming bucket.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention

What is claimed is:

1. A forming bucket for use in the preparation of gas attenuated fiber insulation products, comprising:

a tubular member having a circular fiber inlet and a circular fiber outlet, wherein said fiber outlet has an interior diameter that is smaller than an interior diameter of said fiber inlet, said tubular member having a smooth curvilinear surface for minimizing turbulence in a fiber stream flowing through said forming bucket during said gas attenuation process, said curvilinear surface including an outwardly bowed portion proximate to said fiber inlet and an inwardly bowed portion proximate to said fiber outlet.

2. The forming bucket of claim 1, wherein said curvilinear surface is generally bell shaped.

3. The forming bucket of claim 1, wherein said tubular member further comprises a first cylindrical tubular section adjacent said fiber inlet, said curvilinear surface being disposed between said first section and said fiber outlet.

4. The forming bucket of claim 3, wherein said outwardly bowed portion is coupled to said first section.

5. The forming bucket of claim 1, wherein said tubular member is formed from spun steel.

6. The forming bucket of claim 1, wherein said outwardly bowed portion has a first radius of curvature $R_1$ and said inwardly bowed portion has a second radius of curvature $R_2$.

7. The forming bucket of claim 6, wherein $R_1$ is approximately equal to or greater than $R_2$.

8. A gas attenuated fiber insulation manufacturing system, including:
   at least one fiberizer provided above a collecting belt or forming chain, said fiberizer providing a fiber stream;
   at least one forming bucket disposed between said fiberizer and said collecting belt or forming chain, said forming bucket comprising:
      a tubular member having a circular fiber inlet and a circular fiber outlet, wherein said fiber outlet has an interior diameter that is smaller than an interior diameter of said fiber inlet said tubular member having a smooth curvilinear surface for minimizing turbulence in said fiber stream flowing through said forming bucket during a gas attenuation process, said curvilinear surface including an outwardly bowed portion proximate to said fiber inlet and an inwardly bowed portion proximate to said fiber outlet; and
   a binder source, said binder source providing a binder to said fiber stream.

9. The system of claim 8, wherein said fiber stream includes mineral or glass fibers.

10. The system of claim 8, wherein said curvilinear surface is generally bell shaped.

11. The system of claim 8, wherein said tubular member further comprises a first cylindrical tubular section adjacent said fiber inlet, said curvilinear surface being disposed between said first section and said fiber outlet.

12. The system of claim 11, wherein said outwardly bowed portion is coupled to said first section.

13. The system of claim 12, wherein said outwardly bowed portion has a first radius of curvature $R_1$ and said inwardly bowed portion has a second radius of curvature $R_2$.

14. The system of claim 13, wherein $R_1$ is approximately equal to or greater than $R_2$.

15. The system of claim 7, wherein said system includes a plurality of said forming buckets and a plurality of said fiberizers providing a plurality of fiber streams, each forming bucket being associated with a respective fiberizer, said forming buckets configured to swing across said collecting belt or forming chain to distribute fibers from said fiber streams across the width of said belt or chain.

16. A gas attenuated fiber insulation manufacturing method, comprising the steps of:
   directing a fiber stream through a forming bucket towards a collecting belt or forming chain, said forming bucket including a tubular member having a circular fiber inlet and a circular fiber outlet, wherein said fiber outlet has an interior diameter that is smaller than an interior diameter of said fiber inlet, said tubular member having a smooth curvilinear surface for minimizing turbulence in said fiber stream within said forming bucket, said curvilinear surface including an outwardly bowed portion proximate to said fiber inlet and an inwardly bowed portion proximate to said fiber outlet;
   treating said fibers in said fiber stream with binder; and
   collecting said treated fibers on said collecting belt or forming chain and processing said collected fibers into a fiber insulation product.

17. The method of claim 16, wherein said fiber stream includes mineral or glass fibers.

18. The method of claim 16, wherein a plurality of fiber streams are directed through a plurality of forming buckets, each of said forming buckets shaped to minimize turbulence in a respective fiber stream within a respective forming bucket.

19. The method of claim 18, wherein said forming buckets swing across said belt or chain to distribute fibers from said fiber streams across the width of said collecting belt or forming chain.

20. A gas attenuated fiber insulation manufacturing system, including:
   a collecting belt or forming chain;
   at least one fiberizer positioned above said belt or chain;
   at least one forming bucket disposed between said fiberizer and said belt or chain, said forming bucket comprising:
      a tubular member having a circular fiber inlet and a circular fiber outlet, said fiber outlet having an interior diameter that is smaller than an interior diameter of said fiber inlet, said tubular member having a smooth curvilinear surface,
      wherein said tubular member includes a first section adjacent said fiber inlet, said first section having a uniform diameter for a set length, said curvilinear surface being disposed between said first section and said fiber outlet, and
      wherein said curvilinear surface includes an outwardly bowed portion proximate to said first section and an inwardly bowed portion proximate to said fiber outlet; and
   a binder source disposed between said forming bucket and said belt or chain, said binder source providing a binder to said fiber stream.

21. The system of claim 20, wherein said system includes a plurality of said forming buckets and a plurality of fiberizers providing a plurality of fiber streams, each forming bucket being associated with a respective fiberizer, said forming buckets configured to swing across said belt or chain to distribute fibers from said fiber streams across the width of said belt or chain.

22. The system of claim 21, wherein said outwardly bowed portion has a first radius of curvature $R_1$ and said inwardly bowed portion has a second radius of curvature $R_2$.

23. The system of claim 22, wherein $R_1$ is approximately equal to or greater than $R_2$.

* * * * *